US010491656B2

(12) United States Patent
Kuraki et al.

(10) Patent No.: US 10,491,656 B2
(45) Date of Patent: Nov. 26, 2019

(54) CONTENT TRANSFER SYSTEM, CONTENT TRANSFER APPARATUS AND TERMINAL, AND CONTENT TRANSFER METHOD

(71) Applicant: FUJITSU LIMITED, Kawasaki-shi, Kanagawa (JP)

(72) Inventors: Kensuke Kuraki, Ichikawa (JP); Taizo Anan, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 14/755,792

(22) Filed: Jun. 30, 2015

(65) Prior Publication Data
US 2015/0304393 A1 Oct. 22, 2015

Related U.S. Application Data
(63) Continuation of application No. PCT/JP2013/050486, filed on Jan. 11, 2013.

(51) Int. Cl.
*G06F 15/16* (2006.01)
*H04L 29/08* (2006.01)
*H04N 21/472* (2011.01)

(52) U.S. Cl.
CPC ............ *H04L 67/06* (2013.01); *H04L 67/32* (2013.01); *H04N 21/47202* (2013.01)

(58) Field of Classification Search
CPC ................. H04L 67/06; H04L 67/1095; G06F 17/30864; H04N 19/467
(Continued)

(56) References Cited

U.S. PATENT DOCUMENTS 7,495,793 B2 * 2/2009 Kojima .............. H04N 1/00347
358/1.13
2008/0016177 A1 * 1/2008 Jin ..................... G06F 17/30864
709/217
(Continued)

FOREIGN PATENT DOCUMENTS

JP 2004-194236 7/2004
JP 2008-021293 1/2008
(Continued)

OTHER PUBLICATIONS

CNOA—Office Action of Chinese Patent Application No. 201380070002.1 dated May 26, 2017, with English translation of the Office Action.
(Continued)

*Primary Examiner* — Wing F Chan
*Assistant Examiner* — Andrew Woo
(74) *Attorney, Agent, or Firm* — Fujitsu Patent Center

(57) ABSTRACT

A content transfer system which includes a content transfer apparatus and a terminal is provided. The content transfer apparatus includes: a processor configured to generate a connection signal containing connection information for connecting to the content transfer apparatus via a communication network, and output the connection signal via a connection information output unit; create a list of content associated with a display area displayed on the display unit; and transfer at least one piece of content selected from among the content registered in the list to the terminal when a content transfer request signal is received from the terminal. On the other hand, the terminal includes: a processor configured to recover the connection information from the connection signal; and transmit the content transfer request signal to the content transfer apparatus via the communication network in accordance with the connection information.

15 Claims, 10 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2010/0001072 A1* | 1/2010 | Onogi | G06K 7/10712 |
| | | | 235/454 |
| 2011/0029921 A1* | 2/2011 | Terada | G06F 3/0482 |
| | | | 715/810 |
| 2011/0241823 A1 | 10/2011 | Anders | |
| 2012/0124171 A1 | 5/2012 | Sparks | |
| 2012/0163653 A1 | 6/2012 | Anan et al. | |
| 2012/0199643 A1 | 8/2012 | Minnick et al. | |
| 2014/0090001 A1* | 3/2014 | Das | H04N 21/4722 |
| | | | 725/112 |

FOREIGN PATENT DOCUMENTS

| | | |
|---|---|---|
| JP | 2008-090369 | 4/2008 |
| JP | 2009-205492 | 9/2009 |
| JP | 2011-205485 | 10/2011 |
| JP | 2011-222007 | 11/2011 |
| JP | 2012-142741 | 7/2012 |
| WO | 2012/120524 A2 | 9/2012 |

OTHER PUBLICATIONS

Florian Alt et al.,"Digifieds: Insights into Deploying Digital Public Notice Areas in the Wild", Mobile and Ubiquitous Multimedia, Dec. 7, 2011, pp. 165-174, USA. XP058007208.
EESR—The Extended European Search Report dated Dec. 16, 2015 for European Patent Application No. 13871060.3.
International Search Report, mailed in connection with PCT/JP2013/050486 and dated Mar. 12, 2013.
JPOA—Office Action of Japanese Patent Application No. 2014-556314 dated Jun. 7, 2016, with English translation of the Office Action.
CNOA—Office Action of Chinese Patent Application No. 201380070002.1 dated Nov. 16, 2017, with English translation of the Office Action.
EPOA—Office Action of European Patent Application No. 13 871 060.3 dated Apr. 30, 2018.

* cited by examiner

| FILE NAME | PATH |
|---|---|
| Sample1.txt | C:¥Users¥user¥Documents |
| Sample2.jpg | C:¥Users¥Public¥Pictures¥Sample Pictures |
| Sample3.pdf | C:¥Users¥user¥Desktop |

↖500

CONTENT TRANSFER SYSTEM, CONTENT TRANSFER APPARATUS AND TERMINAL, AND CONTENT TRANSFER METHOD

CROSS-REFERENCE TO RELATED APPLICATION

This application is a continuation application and is based upon PCT/JP2013/050486, filed on Jan. 11, 2013, the entire contents of which are incorporated herein by reference.

FIELD

The present invention relates, for example, to a content transfer system and method for transferring content via a communication network, and a content transfer apparatus and terminal for use in such a content transfer system.

BACKGROUND

When a user wishes to download particular content into his terminal, the user may access a communication network via an apparatus, such as a personal computer, a digital signage terminal, a kiosk terminal, or a smart phone, that stores the content. To achieve such an access, the user needs to acquire connection information for identifying on the communication network the apparatus that stores the content he wishes to download. The connection information includes, for example, an Internet Protocol (IP) address, a service set identifier (SSID), a Bluetooth (registered trademark) ID, and the like.

In view of the above, there is proposed a technique in which data containing apparatus information in addition to wireless connection information is converted into an image pattern and the image pattern is displayed on a display at one apparatus and an image of the image pattern is captured to recover the information at the other apparatus, thereby enabling the apparatuses to be interconnected via a wireless link (for example, refer to Japanese Laid-open Patent Publication No. 2011-205485). There is also proposed a technique in which information such as the IP address, etc., is embedded into image data in the form of digital watermark information (for example, refer to Japanese Laid-open Patent Publication No. 2004-194236).

SUMMARY

However, there are cases where the one apparatus may store a plurality of pieces of content to be transferred. In such cases, the user wishing to download a particular one of the plurality of pieces of content needs to acquire not only the connection information but also the name of the content which he wishes to download and information for identifying its storage location. To acquire such information, the user has to operate the content storing apparatus via a communication network or via the user interface of the apparatus or to refer to a document that stores the name of the particular content, etc.

According to one embodiment, a content transfer system which includes a content transfer apparatus and a terminal is proposed. In the content transfer system, the content transfer apparatus includes: a storage unit which stores a plurality of pieces of content; a display unit which displays at least one display area, each of the at least one display area associated with one of the plurality of pieces of content; a connection information generating unit which generates a connection signal containing connection information for connecting to the content transfer apparatus via a communication network, and which outputs the connection signal via a connection information output unit; a list updating unit which creates a list of content associated with the display area displayed on the display unit from among the plurality of pieces of content; and a transfer unit which, when a content transfer request signal is received from the terminal, transfers at least one piece of content selected from among the content registered in the list to the terminal.

On the other hand, the terminal includes: a connection information acquiring unit which acquires the connection signal; a connection information recovering unit which recovers the connection information from the connection signal; and a transfer request unit which, in accordance with the connection information, transmits the content transfer request signal to the content transfer apparatus via the communication network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A content transfer system will be described below with reference to the drawings. In the content transfer system, a content transfer apparatus which stores a plurality of pieces of content to be transferred creates a list of content associated with a window or windows currently displayed on a display unit of the apparatus, and presents a display of connection information for connecting to the content transfer apparatus. On the other hand, a terminal that is to receive particular content from the content transfer apparatus recovers the connection information by analyzing an image captured of the display screen on the display unit of the content transfer apparatus. Then, when the terminal connects to the content transfer apparatus by using the connection information, the content transfer apparatus refers to the list to identify the content to be transferred to the terminal, and transfers the identified content to the terminal.

Figure 1:
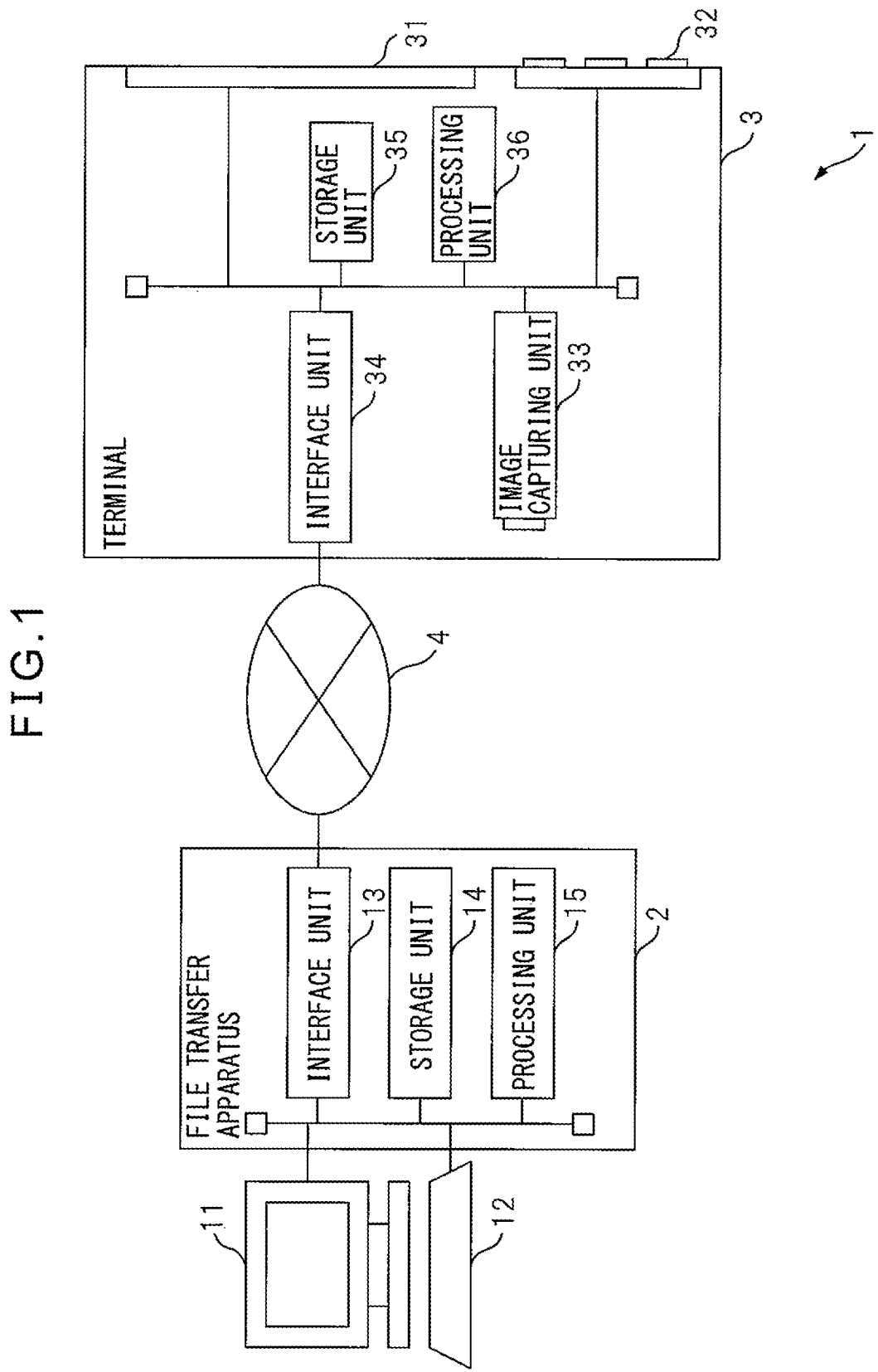
FIG. 1 is a diagram schematically illustrating the configuration of a file transfer system according to a first embodiment of a content transfer system.

FIG. 1 is a diagram schematically illustrating the configuration of a file transfer system according to a first embodiment of a content transfer system.

The file transfer system 1 includes a file transfer apparatus 2 as one example of the content transfer apparatus and at least one terminal 3. The file transfer apparatus 2 and the terminal 3 are connected to each other via a wired or wireless communication network 4. The communication network 4 may be, for example, a communication network such as the Internet to which a large number of communication apparatuses can connect simultaneously. Alternatively, the communication network 4 may be a communication circuit designed to a short-distance communication standard, such as Bluetooth (registered trademark) or ZigBee that directly interconnects the file transfer apparatus 2 and the terminal 3.

In the file transfer system 1, the file transfer apparatus 2 may be, for example, a personal computer, a digital signage terminal, a kiosk terminal, or the like, or may be a portable terminal such as a smart phone or a tablet terminal. On the other hand, the terminal 3 is, for example, a portable terminal such as a mobile phone or a tablet terminal.

In the file transfer system 1, a file as one example of the content is transferred from the file transfer apparatus 2 to the terminal 3. In the present embodiment, the file as one example of the content includes, for example, a document file, an image file, a video file, an audio file, and a computer program.

The file transfer apparatus 2 includes a display unit 11, an operating unit 12, an interface unit 13, a storage unit 14, and a processing unit 15. The file transfer apparatus 2 may further include a speaker (not depicted).

The display unit 11 is one example of a connection information output unit, and includes, for example, a liquid crystal display or an organic electroluminescent display. Then, in accordance with a user operation performed using the operating unit 12 or a computer program operating on the processing unit 15, for example, the display unit 11 displays a window associated with one of the files stored in the storage unit 14. The window is one example of a display area. The display unit 11 also displays an image code received from the processing unit 15 and containing the connection information for connecting to the file transfer apparatus 2. The details of the image code will be described later.

The operating unit 12 includes at least one device selected, for example, from among a pointing device such as a mouse, a keyboard, and an array of operating switches. The operating unit 12 supplies an operation signal to the processing unit 15 in response to a user operation. The display unit 11 and the operating unit 12 may be combined into one unit, for example, in the form of a touch panel display.

The interface unit 13 includes, for example, an interface circuit for connecting the file transfer apparatus 2 to the communication network 4. The interface unit 13 receives a file transfer request signal from the terminal 3 via the communication network 4, and passes it to the processing unit 15. Further, the interface unit 13 transmits various files received from the processing unit 15 to the terminal 3 via the communication network 4.

The storage unit 14 includes at least one device selected, for example, from among a semiconductor memory device, a magnetic disk device, and an optical disk device. The storage unit 14 stores various computer programs to be executed on the file transfer apparatus 2 and various data to be used by the computer programs. The storage unit 14 also stores various files that can be provided to the terminal 3.

The storage unit 14 has a storage space physically or logically divided into a plurality of storage areas. Each of the plurality of files is stored in one of the storage areas. Each storage area is identifiable as a directory or a folder.

The processing unit 15 includes one or a plurality of processors, a memory circuit such as a random access memory, and a peripheral circuit. The processing unit 15 controls the entire operation of the file transfer apparatus 2.

Figure 2:
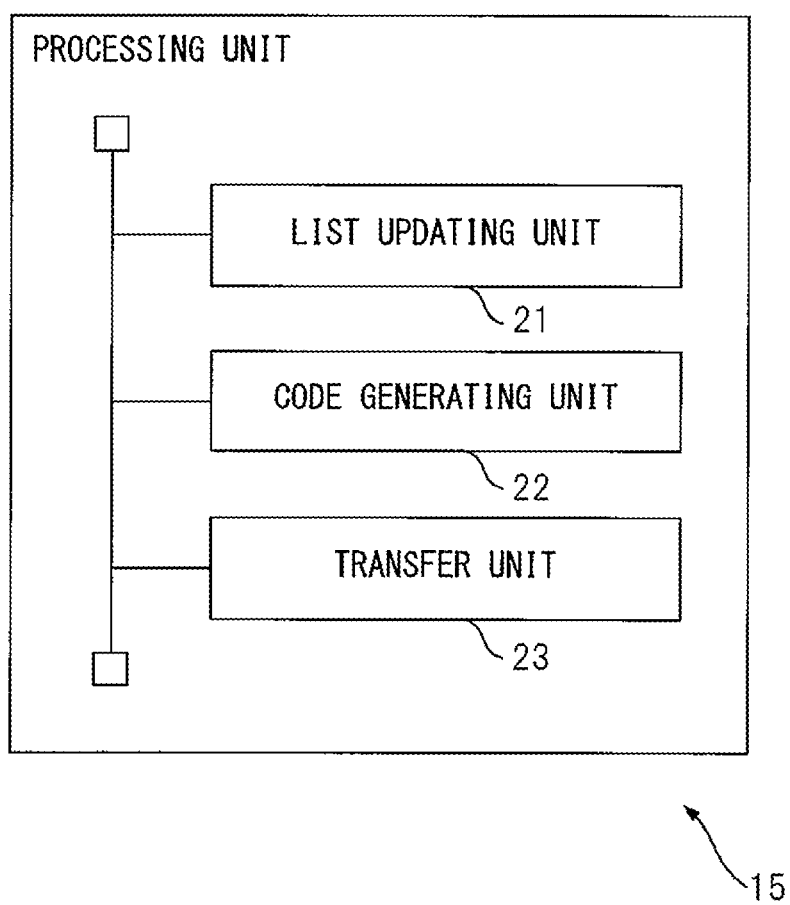
FIG. 2 is a block diagram illustrating the function of a processing unit in a file transfer apparatus according to the first embodiment.

FIG. 2 is a block diagram illustrating the function of the processing unit 15 related to the transfer of content. The processing unit 15 includes a list updating unit 21, a code generating unit 22, and a transfer unit 23. These units constituting the processing unit 15 are functional modules implemented by a computer program executed on the processor of the processing unit 15. Alternatively, the list updating unit 21, the code generating unit 22, and the transfer unit 23 may be implemented on the file transfer apparatus 2 in the form of an integrated circuit separately from the processing unit 15.

The list updating unit 21 generates or updates a transfer file list which is a list of files that may be transferred to the terminal 3. In the present embodiment, the list updating unit 21 registers in the transfer file list the file associated with each window currently displayed on the display unit 11. For this purpose, the list updating unit 21 generates the transfer file list, for example, when the window is first displayed on the display unit 11 after the file transfer apparatus 2 is powered up. Further, the list updating unit 21 updates the transfer file list, for example, each time an operating system operating on the processing unit 15 notifies that a change has occurred in the window displayed on the display unit 11. The operating system will hereinafter be referred to simply as the OS. A change occurs in the window, for example, when a new program involving the display of a window is started up on the processing unit 15 or conversely the program currently being executed is terminated, or when any one of the windows is operated by the user using the operating unit 12. The window operation includes, for example, an operation for closing any one of the windows displayed on the display unit 11, an operation for opening a new window, an operation for changing the size of any one of the windows, or an operation for switching an window from active to inactive or vice versa. That a window is set active means that the window is put in a state that can be operated by the user. Alternatively, the list updating unit 21 may update the transfer file list at predetermined intervals of time, for example, every 30 seconds, every one minute, or every five minutes.

When updating the transfer file list, the list updating unit 21 registers the file associated with each window into the file list, for example, in accordance with the order defined by the size of the window displayed on the display unit 11. In this case, the list updating unit 21 acquires, via the OS API (Application Programming Interface), the height and lateral width of each of the windows displayed on the display unit 11. Then, the list updating unit 21 calculates the area size of each window from its height and lateral width. Further, from the title bar, etc. of each window, the list updating unit 21 acquires, via the OS API, the information for identifying the file associated with the window. A mapping table for mapping the application name or file storage location, i.e., the path indicating the storage area storing the file, to the name and path of the file associated with the window may be prestored in the storage unit 14. In this case, by referring to the mapping table, the list updating unit 21 may identify the name and path of the file corresponding to the application name, etc. acquired from the text information displayed on the title bar, etc.

The list updating unit 21 registers the name and path of the file associated with each window into the transfer file list in decreasing order of window area size. The file associated with each window includes, for example, a file containing the document or image or the like displayed in the window, and a file containing the video or audio or the like being executed by a program associated with the window. The file associated with each window may further include a file whose name or path is displayed in the window.

Alternatively, the list updating unit 21 may register the file associated with each window into the transfer file list in descending order of file update date and time or in ascending order of update date and time. Further alternatively, the list updating unit 21 may register the file associated with each window into the transfer file list in the order in which the window was activated. In this case, each time any one of the windows is activated, the list updating unit 21 acquires, via the OS API, the title bar of the activated window. Then, the list updating unit 21 stores the time of the title bar acquisition as the activation time of the window in the storage unit 14 by associating it with the name of the file associated with the window. The list updating unit 21 may then register the file associated with each window into the transfer file list in the order in which the window was activated by referring to the activation time of the window.

Alternatively, the list updating unit 21 may register the file associated with each window into the transfer file list in accordance with the order defined by the depth position of the window within a stack of overlapping windows.

Figure 3:
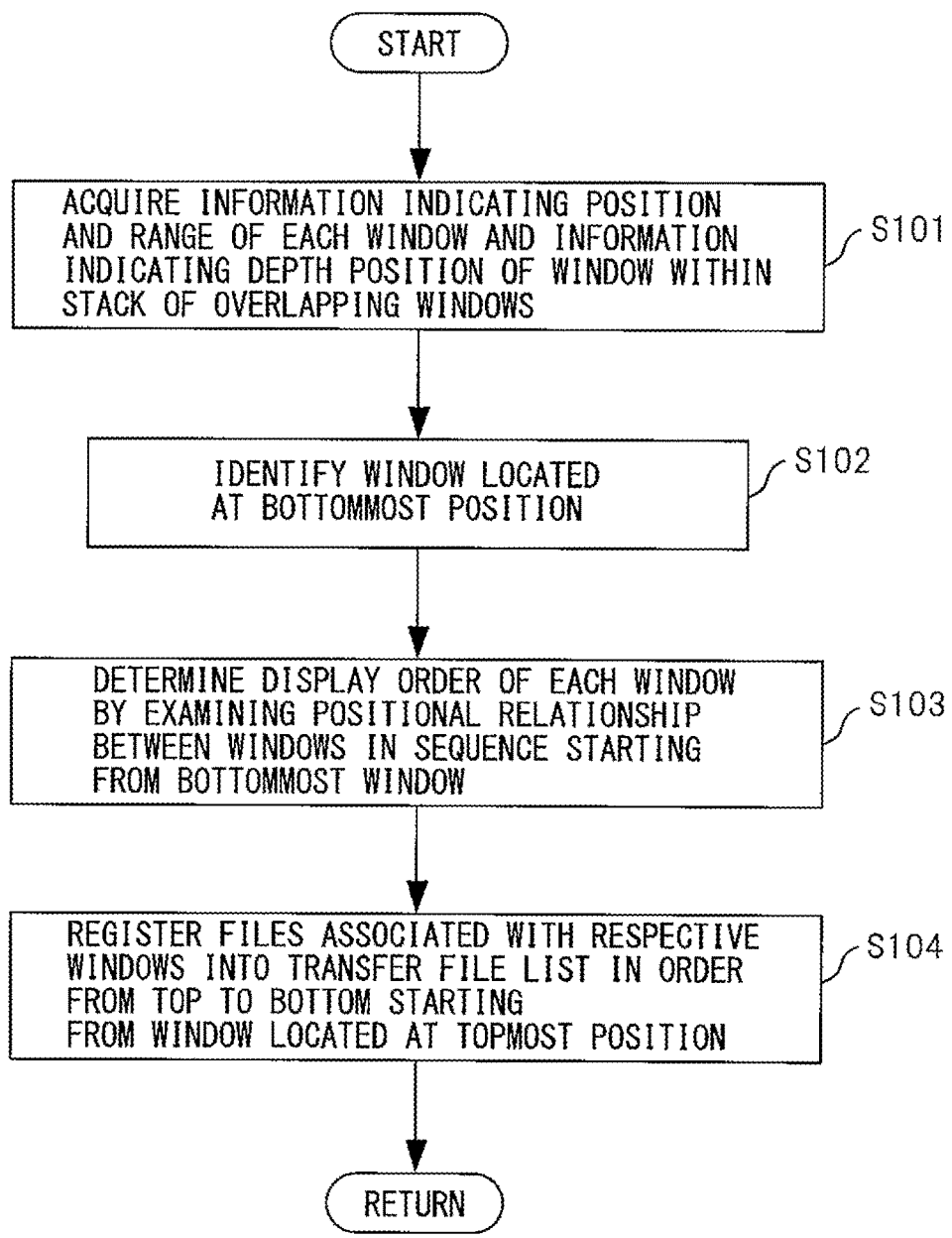
FIG. 3 is a flowchart illustrating a procedure for updating a transfer file list according to the depth position of each window within a stack of overlapping windows.

FIG. 3 is a flowchart illustrating a procedure for updating the transfer file list according to the depth position of each window within a stack of overlapping windows. The list updating unit 21 acquires, via the OS API, information indicating the position and range of each window, for example, information indicating the coordinates of the upper left and lower right corners of each window and information indicating the depth position of the window within the stack of overlapping windows (step S101). Then, the list updating unit 21 identifies the window behind which there are no other windows, for example, as the window located at the bottommost position (step S102). The list updating unit 21 examines the positional relationship between the overlapping windows in sequence starting from the bottommost window, and identifies the window located just in front of the bottommost window. Thus working through the stack from the bottommost window up to the topmost window, the list updating unit 21 sequentially determines the display order of each window (step S103). The list updating unit 21 registers the files associated with the respective windows into the transfer file list in order from top to bottom with the file associated with the topmost window at the top of the list (step S104).

Figure 4:
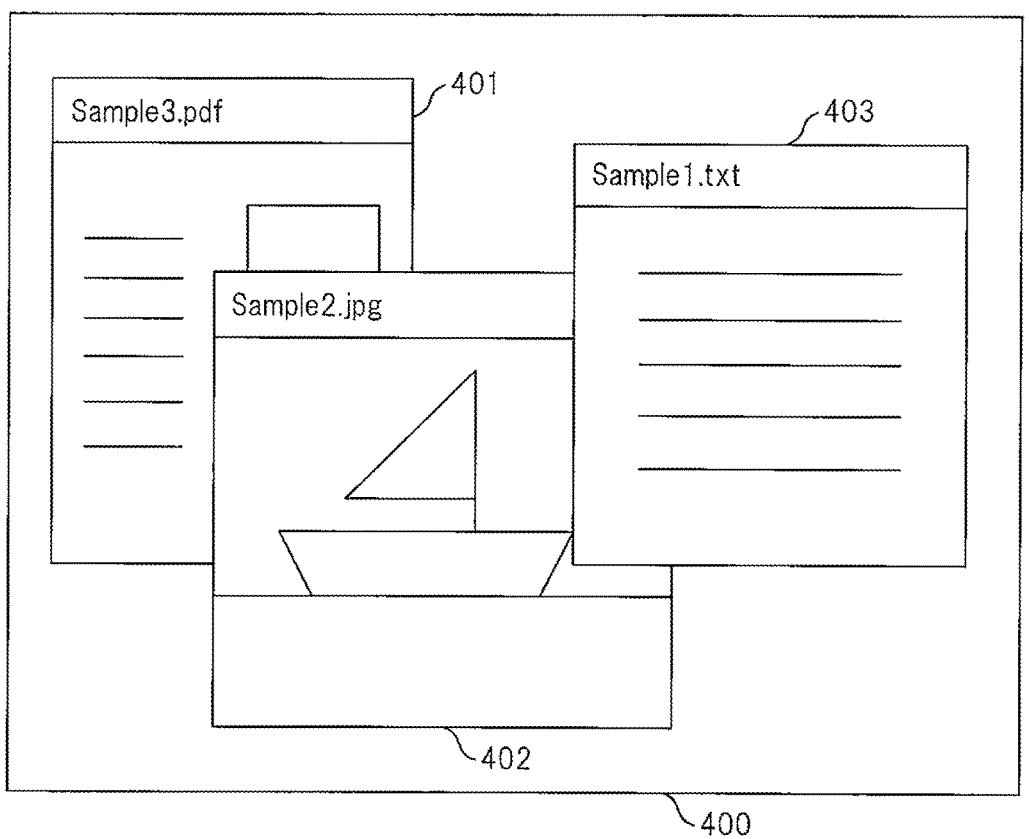
FIG. 4 is a diagram illustrating one example of a display screen on a display unit.

FIG. 4 is a diagram illustrating one example of a display screen on the display unit 11. In FIG. 4, three windows 401 to 403 are displayed on the display screen 400. The window 401 is located at the bottommost position, and the window 402 is located in front of the window 401. The window 403 is located in front of the window 402. In other words, the window 403 is located at the topmost position. A document file Sample1.txt is displayed in the window 403. An image file Sample2.jpg is displayed in the window 402. A document file Sample3.pdf is displayed in the window 401.

Figures 5, 6:
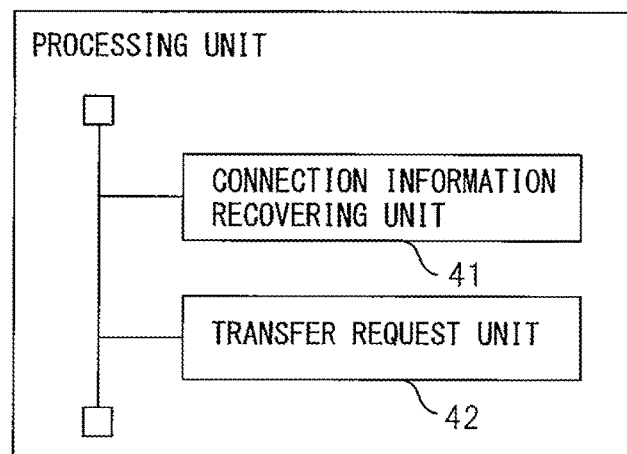
FIG. 5 is a diagram illustrating one example of the transfer file list corresponding to FIG. 4.
FIG. 6 is a block diagram illustrating the function of a processing unit related to the transfer of files.

FIG. 5 is a diagram illustrating one example of the transfer file list corresponding to FIG. 4. Each entry in the left side of the transfer file list 500 carries the name of the file to be transferred. On the other hand, each entry in the right side of the transfer file list 500 indicates the path of the file carried in the left side entry. Since the window 403 is displayed at the topmost position in FIG. 4, the file Sample1.txt associated with the window 403 is registered at the top of the transfer file list 500. Since the windows 402 and 401 are displayed in this order from the top in FIG. 4, the file Sample2.jpg associated with the window 402 is registered at the second entry from the top of the transfer file list 500. The file Sample3.pdf associated with the window 401 is registered at the third entry from the top.

The list updating unit 21 may determine the file registration order by combining some of the file registration order determining methods as above described. For example, when determining the file registration order based on the depth position of each window within a stack of overlapping windows, there can occur cases where a plurality of windows exist that do not overlap each other. In such cases, the list updating unit 21 may determine the file registration order by the window size or the update date and time for each of the windows that do not overlap each other.

Each time the transfer file list is updated, the list updating unit 21 stores the updated transfer file list in the designated storage area in the storage unit 14.

The code generating unit 22, which is one example of a connection information generating unit, generates an image code containing the connection information for allowing the terminal 3 to access the file transfer apparatus 2 via the communication network 4, and displays the image code on the display screen of the display unit 11. For example, the connection information may be address information on the communication network 4, such as the IP address of the file transfer apparatus 2, the SSID, or the Bluetooth (registered trademark) ID. Alternatively, the connection information may be an identification number uniquely associated with the address information of the file transfer apparatus 2. In this case, a mapping table for mapping the identification number to the address information of the file transfer apparatus 2 is prestored in the terminal 3. Then, by referring to the mapping table, the terminal 3 identifies the address information of the file transfer apparatus 2 corresponding to the identification number recovered by analyzing the image code. Alternatively, the mapping table for mapping the identification number to the address information of the file transfer apparatus 2 may be stored in a server (not depicted) which is connected to the communication network 4 and to which the terminal 3 can connect as desired. In this case, the terminal 3 sends the identification number and the address information of the terminal 3 to the server. Then, the server refers to the mapping table to identify the address information of the file transfer apparatus 2 corresponding to the identification number, and sends the address information to the terminal 3.

The image code is one example of a connection signal, and may be, for example, a two-dimensional code such as a QR code (registered trademark). In this case, the code generating unit 22 displays the image code in a designated position, for example, in the upper left corner or lower right corner of the display screen on the display unit 11.

Alternatively, the image code may be a digital watermark embedded in the display screen on the display unit 11. In this case, the code generating unit 22 displays, in a designated position on the display screen, a digital watermark that stores a character code representing numeric or alphabetic characters contained in the connection information or that represents the character code in a bit string in the binary system. Since the digital watermark is not easily perceivable by the user, this serves to alleviate the stress that the user may have when an object, such as a QR code (registered trademark), other than a window is displayed in a portion of the display screen of the display unit 11.

Further alternatively, the code generating unit 22 may generate the image code in the form of a window in which the connection information is written in text format and display the window on the display screen of the display unit 11 in a position that does not overlap any other window. In this case, it is preferable that a prescribed mark indicating the presence of the image code containing the connection information is displayed in a designated position on the window in order to facilitate the detection of the window from the image that the terminal 3 captured of the display screen of the display unit 11.

The code generating unit 22 may have the image code containing the connection information constantly displayed, for example, while the file transfer apparatus 2 is operating. Alternatively, the code generating unit 22 may start to display the image code when a certain kind of operation is performed on the operating unit 12 and may stop displaying the image code when a predetermined period of time (for example, three minutes, five minutes, or ten minutes) has elapsed from the last operation.

When the file transfer apparatus 2 receives the file transfer request signal from the terminal 3, the transfer unit 23 refers to the transfer file list and, in accordance with a prescribed rule, identifies at least one of the files registered in the transfer file list. Then, the transfer unit 23 transfers the identified file to the terminal 3 via the communication network 4.

For example, the transfer unit 23 transfers a predetermined number (for example, 1 to 3) of files to the terminal 3 in sequence starting from the file registered at the top of the transfer file list. Alternatively, the transfer unit 23 may transfer a predetermined number (for example, 1 to 3) of files to the terminal 3 in sequence starting from the file registered at the bottom of the transfer file list. Further alternatively, the transfer unit 23 may transfer all the files registered in the transfer file list to the terminal 3.

Alternatively, the transfer unit 23 may select files that can be used by the terminal 3 from among the files registered in the transfer file list, and may transfer the selected files to the terminal 3.

In order for the transfer unit 23 to determine which file can be used by the terminal 3, a table that indicates the file format that can be used by the terminal 3, for example, may be prestored in the storage unit 14. Such a table is created in advance, for example, by the user of the terminal 3 operating the operating unit 12 of the file transfer apparatus 2.

For each file registered in the transfer file list, the transfer unit 23 determines whether the format of the file is registered in the table. When the format of the file is registered, the transfer unit 23 transfers the file to the terminal 3. Alternatively, the transfer unit 23 may transfer each file registered in the transfer file list to the terminal 3 after converting it to the format that can be used by the terminal 3.

Alternatively, for each file, the identification information of the terminal to which the file can be transferred may be prestored in the storage unit 14. In this case, for each file registered in the transfer file list, the transfer unit 23 determines whether the identification information of the terminal 3 carried in the file transfer request signal matches the identification information of the terminal to which the file can be transferred. Only when they match, does the transfer unit 23 transfer the file to the terminal 3.

The transfer unit 23 can transfer the file in accordance with one of various file transfer protocols. The file transfer protocol that can be used by the transfer unit 23 may be, for example, File Transfer Protocol (FTP) or Server Message Block (SMB). Further, in order to ensure transfer path security, the transfer unit 23 may use a transfer file encryption protocol, such as ftps, to transfer the file.

The transfer unit 23 may transfer the file to the terminal 3 only when the identity of the user has been authenticated. In this case, when the file transfer apparatus 2 receives the file transfer request signal from the terminal 3, the transfer unit 23 may cause the display unit 11 to display a message, prompting the user to enter the user's identification number and password. In response, the user enters the user's identification number and password via the operating unit 12. Alternatively, the transfer unit 23 may transmit a message to the terminal 3 via the communication network 4, prompting the user to enter the user's identification number and password. Then, the transfer unit 23 may receive the user's identification number and password from the terminal 3 via the communication network 4. The transfer unit 23 transfers the file only when the entered identification number and password match the identification number and password prestored in the storage unit 14 in the file transfer apparatus 2. Further, once the authentication is done successfully, the processing unit 15 may store the user's identification number and password in the storage unit 14 together with the identification information of the terminal 3 carried in the file transfer request signal. In this case, the next time the file transfer request signal is received, the transfer unit 23 checks to see if the identification information of the terminal carried in the file transfer request signal matches the identification information of the terminal stored in the storage unit 14. If they match, the transfer unit 23 may transfer the file without requesting the user to enter the user's identification number and password.

Referring back to FIG. 1, the terminal 3 is a terminal that receives files from the file transfer apparatus 2. For this purpose, the terminal 3 includes a display unit 31, an operating unit 32, an image capturing unit 33, an interface unit 34, a storage unit 35, and a processing unit 36. The terminal 3 may further includes a microphone (not depicted).

The display unit 31 includes, for example, a liquid crystal display or an organic electroluminescent display. The display unit 31 displays various information received from the processing unit 36, for example, one of the files received from the file transfer apparatus 2.

The operating unit 32 includes, for example, an array of operating switches. The operating unit 32 supplies an operation signal to the processing unit 36 in response to a user operation. The display unit 31 and the operating unit 32 may be combined into one unit, for example, in the form of a touch panel display.

The image capturing unit 33 is one example of a connection information acquiring unit, and includes an area sensor constructed from a two-dimensional array of solid-state imaging devices and a focusing optic for focusing an image of a subject onto the area sensor. Each time the user performs an image capturing operation using the operating unit 32, the image capturing unit 33 captures an image of the subject to generate the image of the subject. In the present embodiment, the user directs the image capturing unit 33 toward the display screen on the display unit 11 of the file transfer apparatus 2 and shoots the display screen to capture an image of the image code containing the connection information. The image capturing unit 33 may generate a video by shooting the display screen of the display unit 11 of the file transfer apparatus 2 continuously for a predetermined period of time. The image capturing unit 33 passes the generated image to the processing unit 36.

The interface unit 34 includes, for example, an interface circuit for connecting the terminal 3 to the communication network 4. The interface unit 34 may be, for example, a circuit for connecting to the communication network 4 via a base station in a mobile telephone network, or may be a communication interface circuit designed to a short-distance communication standard.

The interface unit 34 transmits a file transfer request signal to the file transfer apparatus 2 via the communication network 4. Further, the interface unit 34 receives a file from the file transfer apparatus 2 via the communication network 4, and passes it to the processing unit 36.

The storage unit 35 includes, for example, a readable/writable nonvolatile semiconductor memory. The storage unit 35 stores various computer programs to be executed on the terminal 3 and various data to be used by the computer programs. The storage unit 35 also stores various files received from the file transfer apparatus 2, for example, a document file, an image file, a video file, an audio file, or a computer program. The storage unit 35 may also store images generated by the image capturing unit 33.

The processing unit 36 includes one or a plurality of processors, a memory circuit such as a random access memory, and a peripheral circuit. The processing unit 36 controls the entire operation of the terminal 3.

FIG. 6 is a block diagram illustrating the function of the processing unit 36 related to the transfer of files. The processing unit 36 includes a connection information recovering unit 41 and a transfer request unit 42. These units constituting the processing unit 36 are functional modules implemented by a computer program executed on the processor of the processing unit 36.

The connection information recovering unit 41 identifies the image code by analyzing the image captured of the display screen on the display unit 11 of the file transfer apparatus 2. Then, the connection information recovering unit 41 recovers the connection information of the file transfer apparatus 2 by analyzing the image code. When the image code is a QR code (registered trademark), as earlier described, the connection information recovering unit 41 detects the QR code (registered trademark) from the image by performing template matching between the image and a template representing a geometric shape peculiar to the QR code (registered trademark). Then, in accordance with the format of the QR code (registered trademark), the connection information recovering unit 41 recovers the connection information embedded within the QR code (registered trademark).

When the image code is a digital watermark, the connection information recovering unit 41 recovers the connection information by decoding the character code or bit string stored in the digital watermark in accordance with the scheme employed for the digital watermark. To store the connection information in a digital watermark, or to recover the connection information from the digital watermark, the file transfer apparatus 2 and the terminal 3 can use various techniques for embedding a digital watermark in an image or for detecting a digital watermark embedded in an image. For example, of the technique disclosed in Japanese Laid-open Patent Publication No. 2004-194236 or Japanese Laid-open Patent Publication No. 2012-142741 may be used.

When the image code is presented in the form of a window in which the connection information is written in text format, the connection information recovering unit 41 detects the window on the image by detecting the prescribed mark on the window through template matching. Then, the connection information recovering unit 41 may recover the connection information by decoding the text in the window by using any one of various optical character recognition (OCR) techniques.

The connection information recovering unit 41 passes the connection information to the transfer request unit 42.

The transfer request unit 42, in accordance with the communication protocol of the communication network 4, transmits the file transfer request signal to the file transfer apparatus 2 identified by the connection information. The file transfer request signal includes, for example, the identification information of the terminal 3, such as the IP address of the terminal 3, the SSID, or the Bluetooth (registered trademark) ID, and a prescribed bit string requesting the transfer of a file.

When the requested file is received from the file transfer apparatus 2 via the communication network 4, the transfer request unit 42 stores the file in the storage unit 35.

Figure 7:
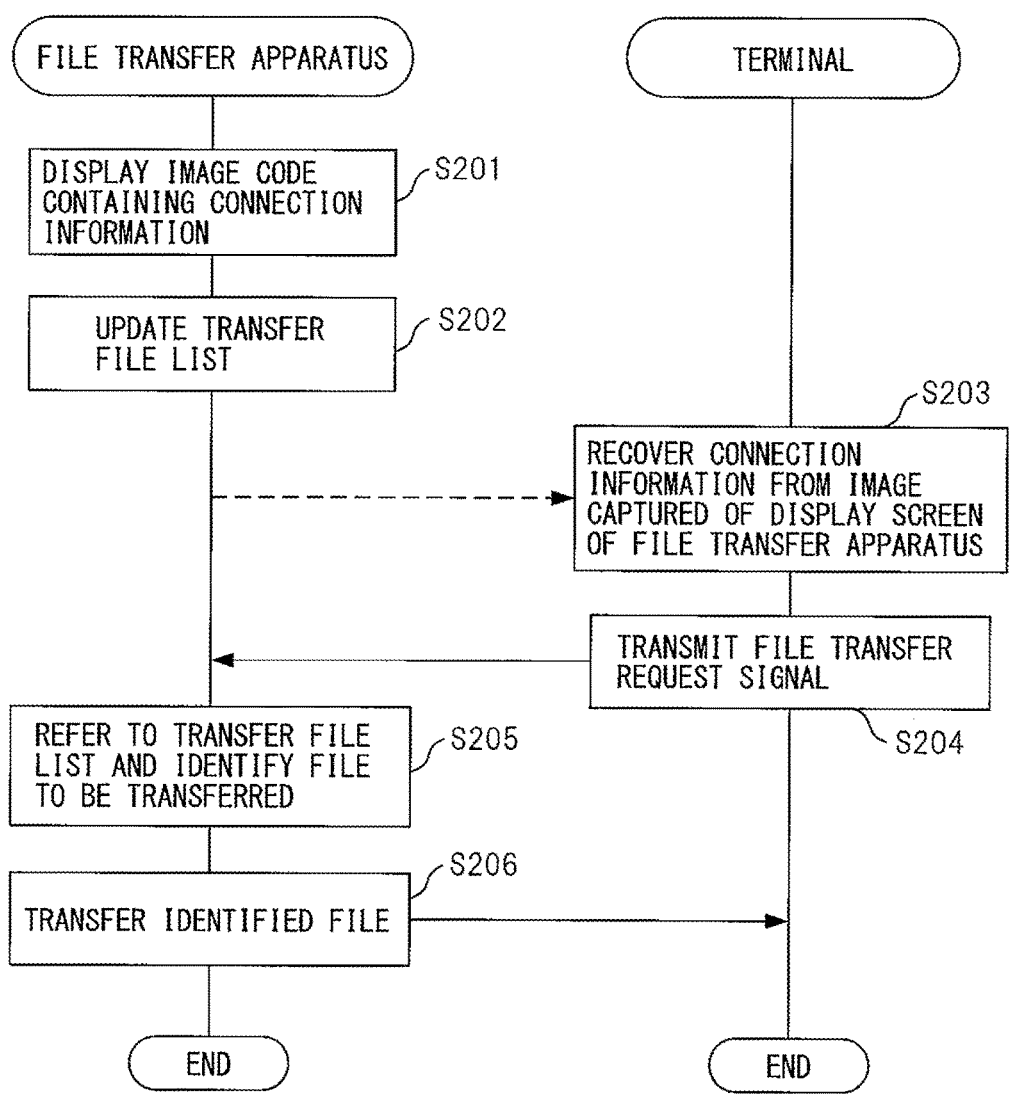
FIG. 7 is a diagram illustrating a file transfer sequence according to the first embodiment.

FIG. 7 is a diagram illustrating a file transfer sequence according to the first embodiment of the content transfer procedure.

The file transfer apparatus 2 displays the image code containing the connection information on the display screen of the display unit 11 (step S201). Further, the file transfer apparatus 2 updates the transfer file list at predetermined intervals of time or at any time when a change is made to any one of the windows displayed on the display unit 11 (step S202).

On the other hand, the terminal 3 recovers the connection information by analyzing the image that the image capturing unit 33 captured of the display screen on the display unit 11 of the file transfer apparatus 2 (step S203). Then, based on the connection information, the terminal 3 transmits the file transfer request signal to the file transfer apparatus 2 via the communication network 4 (step S204).

When the file transfer request signal is received, the file transfer apparatus 2 refers to the transfer file list and identifies the file to be transferred to the terminal 3 (step S205). Then, the file transfer apparatus 2 transfers the identified file to the terminal 3 via the communication network 4 (step S206). Thereafter, the file transfer system 1 terminates the file transfer procedure.

As has been described above, even if there are a plurality of files to be transferred, the file transfer system can identify, on behalf of the user, the file that the file transfer apparatus is requested to transfer, and can transfer the file to the terminal. The file transfer system can thus reduce the operating burden on the user when transferring the requested file.

According to a modified example, the image code may include, in addition to the connection information, the name and path of the file to be transferred to the terminal 3. In this case, each time the transfer file list is updated, for example, the code generating unit 22 updates the image code so that the name and path of the file registered at the top of the most recently updated transfer file list will be included in the image code. Then, the code generating unit 22 displays the updated image code on the display screen of the display unit 11.

On the other hand, the connection information recovering unit 41 in the terminal 3 analyzes the image captured of the display screen of the display unit 11 and thereby recovers not only the connection information but also the name and path of the file to be transferred. Then, in accordance with a file transfer protocol such as ftp or ftps, the transfer request unit 42 in the terminal 3 transmits the file transfer request signal to the file transfer apparatus 2 via the communication network 4. In this example, not only the file name but also the path of the file to be transferred is carried in the file transfer request signal. Therefore, the file transfer apparatus 2 that received the file transfer request signal can transfer the requested file to the terminal 3 by identifying the file to be transferred and its storage location without having to refer to the transfer file list.

According to another modified example, the list updating unit 21 in the file transfer apparatus 2 may assign a sequence number to the transfer file list and store the sequence number in the storage unit 14 along with the transfer file list. The sequence number is, for example, a consecutive number from 0 to 9, and each time the transfer file list is updated, the list updating unit 21 increments the sequence number by one. When the sequence number exceeds 9, the number is reset to 0. The storage unit 14 stores the transfer file lists with the sequence numbers 0 to 9.

Further, each time the transfer file list is updated, the code generating unit 22 also updates the image code by including in the image code not only the connection information but also the sequence number of the updated transfer file list.

On the other hand, the connection information recovering unit 41 in the terminal 3 recovers not only the connection information but also the sequence number of the transfer file list from the image code. Then, the transfer request unit 42 transmits the file transfer request signal by including the sequence number therein.

When the file transfer request signal is received, the transfer unit 23 in the file transfer apparatus 2 acquires the sequence number from the file transfer request signal. Then, the transfer unit 23 reads the storage unit 14 to retrieve the transfer file list identified by the sequence number, and identifies from the transfer file list the file to be transferred.

According to the above modified example, the file to be transferred is identified based on the window arrangement when the user using the terminal 3 captured the image of the display screen on the display unit 11 of the file transfer apparatus 2. Accordingly, even if any one of the windows displayed on the display unit 11 is changed by an unintended operation after the image has been captured, the file transfer apparatus 2 can appropriately determine the file to be transferred without being affected by the unintended operation.

Next, a file transfer system according to a second embodiment of a content transfer system will be described.

In the file transfer system according to the second embodiment, the terminal that acquired the connection information transmits a transfer file list request signal to the file transfer apparatus, based on the connection information. In response, the file transfer apparatus transmits the transfer file list to the terminal. Then, the user selects the desired file by referring to the transfer file list displayed on the terminal, and the terminal transmits the transfer file list request signal to the file transfer apparatus by including therein the name, etc. of the selected file.

The file transfer system of the second embodiment differs from the file transfer system of the first embodiment in a portion of the processing performed by the processing unit in the file transfer apparatus and a portion of the processing performed by the processing unit in the terminal. The following description therefore deals only with the differences from the file transfer system of the first embodiment. For the other component elements, refer to the description of the corresponding component elements of the file transfer system of the first embodiment.

Figure 8:
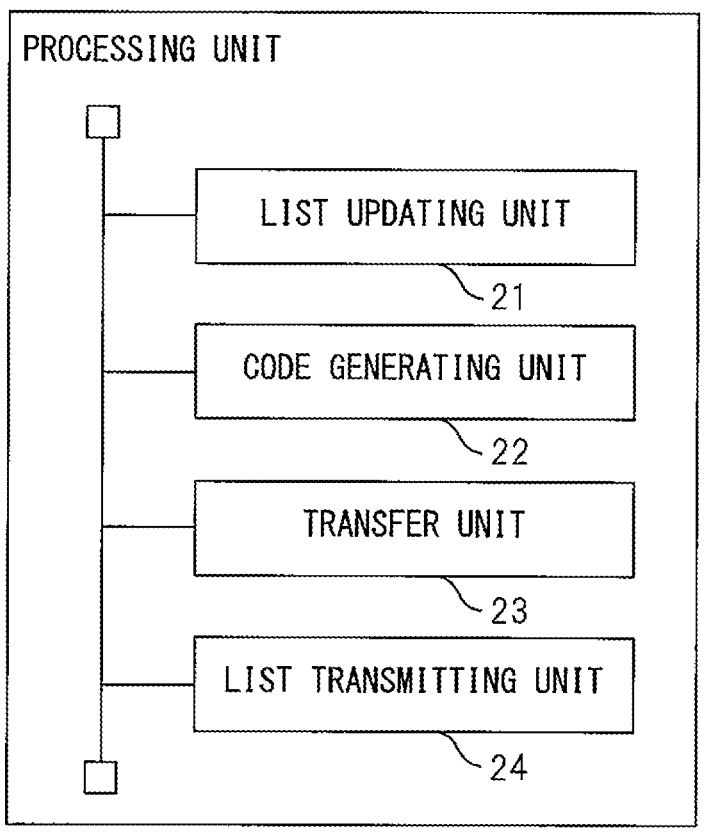
FIG. 8 is a block diagram illustrating the function of a processing unit in a file transfer apparatus according to a second embodiment.

FIG. 8 is a block diagram illustrating the function of a processing unit 151 in the file transfer apparatus according to the second embodiment of the content transfer apparatus. In FIG. 8, corresponding units in the processing unit 151 to those in the processing unit 15 of the first embodiment are designated by the same reference numerals. The processing unit 151 includes a list updating unit 21, a code generating unit 22, a transfer unit 23, and a list transmitting unit 24. The processing unit 151 in the file transfer apparatus of the second embodiment differs from the processing unit 15 in the file transfer apparatus of the first embodiment by the inclusion of the list transmitting unit 24 and in the processing performed by the transfer unit 23. The following therefore describes the list transmitting unit 24 and the transfer unit 23.

When the list request signal is received from the terminal 3 via the communication network 4, the list transmitting unit 24 transmits the transfer file list stored in the storage unit 14 to the terminal 3 via the communication network 4. It is preferable that the transfer file list is created in a format that can be handled by the terminal 3. Therefore, the list transmitting unit 24 may transmit the transfer file list to the terminal 3 after converting it into a text-based format such as csv or a widely used format such as XML.

When the file transfer request signal is received from the terminal 3 after the file transfer apparatus 2 has transmitted the transfer file list to the terminal 3, the transfer unit 23 refers to the file name and path carried in the file transfer request signal and identifies the file to be transferred and its storage location. Then, the transfer unit 23 transfers the file to the terminal 3 via the communication network 4 in accordance with a protocol, for example, such as ftp, ftps, or SMB.

Figure 9:
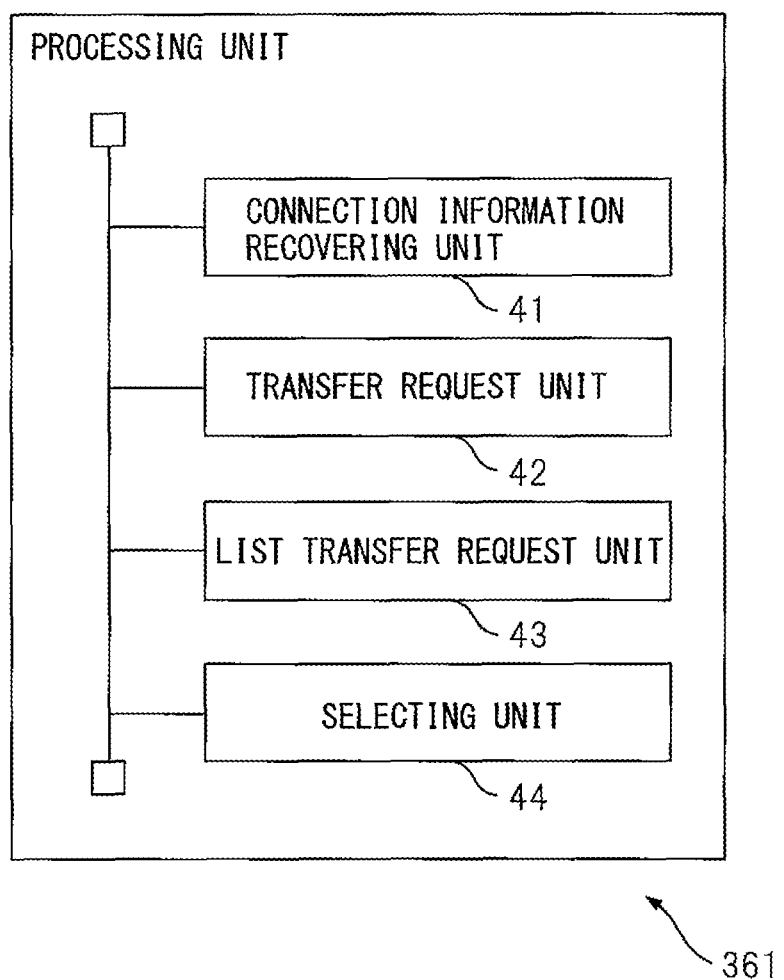
FIG. 9 is a block diagram illustrating the function of a processing unit in a terminal according to the second embodiment.

Next, the terminal 3 will be described. FIG. 9 is a block diagram illustrating the function of a processing unit 361 in the terminal 3 according to the second embodiment. In FIG. 9, corresponding units in the processing unit 361 to those in the processing unit 36 of the first embodiment depicted in FIG. 6 are designated by the same reference numerals. The processing unit 361 includes a connection information recovering unit 41, a transfer request unit 42, a list transfer request unit 43, and a selecting unit 44. The processing unit 361 in the terminal of the second embodiment differs from the processing unit 36 in the terminal of the first embodiment by the inclusion of the list transfer request unit 43 and selecting unit 44 and in the processing performed by the transfer request unit 42. The following therefore describes the transfer request unit 43, the selecting unit 44, and the transfer request unit 42.

The list transfer request unit 43, in accordance with the communication protocol of the communication network 4, transmits the list request signal to the file transfer apparatus 2 identified by the connection information. The list request signal includes, for example, the identification number of the terminal 3, such as the IP address of the terminal 3, the SSID, or the Bluetooth (registered trademark) ID, and a prescribed bit string requesting the transfer of the transfer file list. The prescribed bit string requesting the transfer of the transfer file list is a bit string that differs from the bit string carried in the file transfer request signal requesting the transfer of a file.

When the transfer file list is received from the file transfer apparatus 2 via the communication network 4, the list transfer request unit 43 stores the transfer file list in the storage unit 35.

The selecting unit 44 causes the display unit 31 to display the file names registered in the transfer file list. Then, the selecting unit 44 selects the desired file in response to the user operation performed on the operating unit 32.

Figure 10:
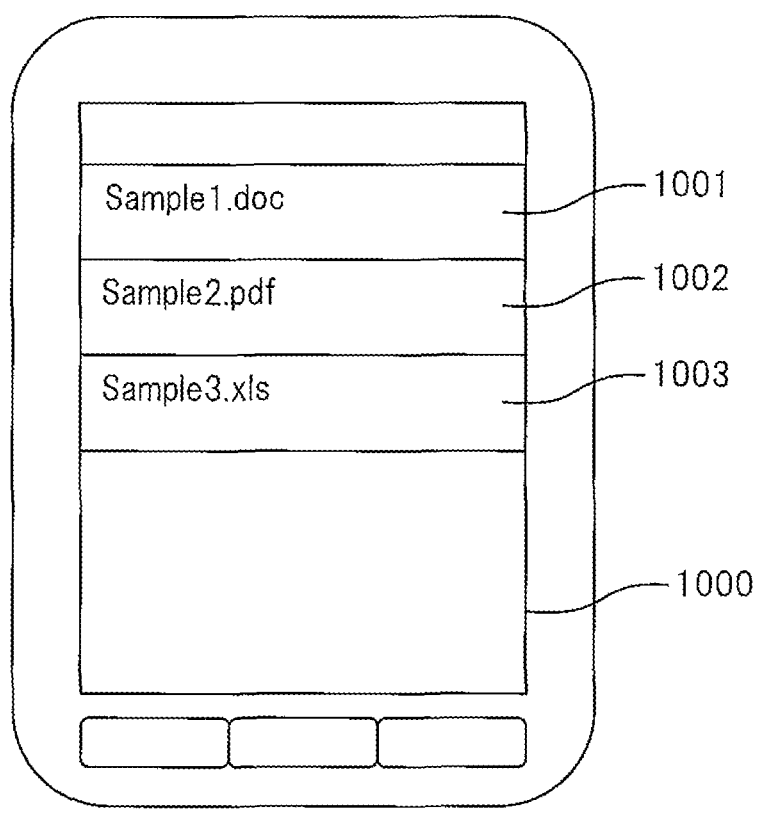
FIG. 10 is a diagram illustrating one example of a display screen on a display unit in the terminal to select a file desired to be transferred.

FIG. 10 is a diagram illustrating one example of the display screen on the display unit 31 to select the file desired to be transferred. For example, the selecting unit 44 causes the display unit 31 to display on the display screen 1000 the buttons 1001 to 1003 designating the names of the respective files registered in the transfer file list. Then, when the user depresses one of the buttons 1001 to 1003 via the operating unit 32, the operating unit 32 sends a signal corresponding to the depressed button to the selecting unit 44. The selecting unit 44 identifies the selected file by referring to the signal. The selecting unit 44 may cause the display unit 31 to display not only the file name but also the file path. The number of files to be selected is not limited to one, but more than one file may be selected.

Of the files registered in the transfer file list, the selecting unit 44 may cause the display unit 31 to display only the file(s) that can be used by the terminal 3. For example, a table that indicates the file format that can be used by the terminal 3 is prestored in the storage unit 35. Then, for each file registered in the transfer file list, the selecting unit 44 determines whether the format of the file is registered in the table. If the format of the file is registered, the selecting unit 44 causes the display unit 31 to display the file.

The transfer request unit 42 creates the file transfer request signal by including therein the name and path of the file selected by the selecting unit 44. Then, in accordance with a file transfer protocol such as ftp or ftps, for example, the transfer request unit 42 transmits the file transfer request signal to the file transfer apparatus 2 via the communication network 4.

Figure 11:
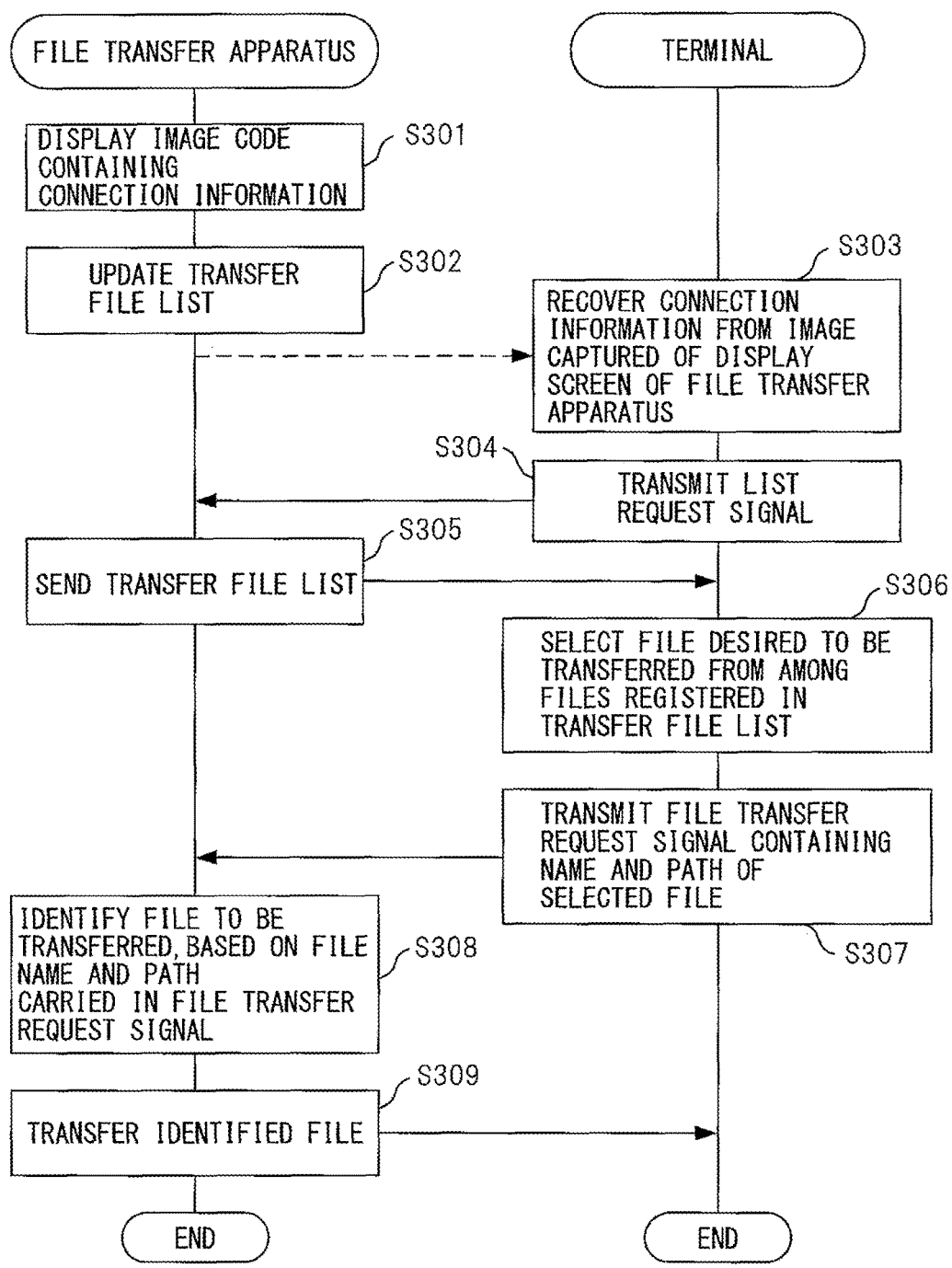
FIG. 11 is a diagram illustrating a file transfer sequence according to the second embodiment.

FIG. 11 is a diagram illustrating a file transfer sequence according to the second embodiment of the content transfer procedure.

The file transfer apparatus 2 displays the image code containing the connection information on the display screen of the display unit 11 (step S301). Further, the file transfer apparatus 2 updates the transfer file list at predetermined intervals of time or at any time when a change is made to any one of the windows displayed on the display unit 11 (step S302).

On the other hand, the terminal 3 recovers the connection information by analyzing the image that the image capturing unit 33 captured of the display screen on the display unit 11 of the file transfer apparatus 2 (step S303). Then, based on the connection information, the terminal 3 transmits the list request signal to the file transfer apparatus 2 via the communication network 4 (step S304).

When the list request signal is received, the file transfer apparatus 2 sends the transfer file list to the terminal 3 (step S305). When the transfer file list is received, the terminal 3 causes the display unit 31 to display the names, etc. of the files registered in the list, from which the user selects via the operating unit 32 the file desired to be transferred (step S306). Then, the terminal 3 transmits the file transfer request signal containing the name and path of the selected file (step S307).

When the file transfer request signal is received, the file transfer apparatus 2 identifies the file to be transferred to the terminal 3, based on the name and path of the file carried in the file transfer request signal (step S308). Then, the file transfer apparatus 2 transfers the identified file to the terminal 3 via the communication network 4 (step S309). Thereafter, the file transfer system 1 terminates the file transfer procedure.

In the second embodiment, by just selecting the desired file from the transfer file list, the user can acquire the file from the file transfer apparatus.

In a modified example, the code generating unit in the file transfer apparatus may superimpose the connection information on an audio signal and may output the audio signal from the speaker of the file transfer apparatus. In this case, the speaker of the file transfer apparatus is one example of the connection information output unit, and the audio signal on which the connection information is superimposed is one example of the connection signal. The audio signal output from the file transfer apparatus is detected by the terminal using a microphone which is one example of the connection information acquiring unit; then, the connection information recovering unit may recover the connection information by analyzing the audio signal. To superimpose the connection information on the audio signal and to recover the connection information from the audio signal, the file transfer apparatus and the terminal can use the techniques disclosed, for example, in International Publication Pamphlet No. WO2011/014292, In another modified example, the content to be transferred to the terminal may not be a file. For example, if the window displayed on the display screen of the display unit of the content transfer apparatus is a browser, the content may be information, for example, Uniform Resource Locator (URL), that indicates the Web page displayed in the browser. In this case, the URL of the Web page displayed in the browser, for example, is registered as the content in the transfer content list.

Then, when a signal requesting the transfer of the content is received from the terminal, the content transfer apparatus sends the URL registered in the transfer content list to the terminal. Then, the terminal connects to a Web server in accordance with the URL, and receives from the Web server the Web page file specified by the URL.

According to still another modified example, the OS of the file transfer apparatus is not limited to the OS that displays the files and their related information in the form of windows, but may be an OS that can display a plurality of pieces of content and their related information in the form of tiles. In that case, each tile is one example of the display area of the associated content. The list updating unit in the content transfer apparatus registers the content associated with each tile in the transfer content list in the order in which the tile was activated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A content transfer system including a content transfer apparatus and a terminal, the content transfer apparatus comprising:

a storage device configured to store a plurality of pieces of content;

a display configured to display at least one display area, each of the at least one display area associated with one of the plurality of pieces of content; and a processor configured to generate a connection signal containing connection information for connecting to the content transfer apparatus via a communication network, and output the connection signal via a connection information output device;

create a list of content associated with the display area displayed on the display from among the plurality of pieces of content, and update the list at predetermined intervals of time or at any time when a change is made to any one of the display areas displayed on the display; and transfer at least one piece of content selected from among content registered in the list among the plurality of pieces of content to the terminal when a content transfer request signal is received from the terminal, and wherein the terminal includes:
a connection information acquiring device configured to acquire the connection signal; and
a processor configured to
recover the connection information from the connection signal; and
transmit the content transfer request signal to the content transfer apparatus via the communication network in accordance with the connection information, wherein the updating the list stores the list in the storage device along with a sequence number which changes each time the list is updated, the generating the connection signal containing connection information generates the connection signal by including therein the sequence number corresponding to the most recently updated list each time the list is updated, the recovering the connection information recovers the sequence number along with the connection information from the connection signal, the transmitting the content transfer request signal transmits the content transfer request signal by including therein the recovered sequence number, and the transferring the at least one piece of content identifies the content to be transferred to the terminal by referring to the list corresponding to the sequence number included in the content transfer request signal.

2. The content transfer system according to claim 1, wherein the display area is a window, and the creating the list registers the content associated with each display area into the list in accordance with an order defined by depth position of the display area within a stack of overlapping display areas.

3. The content transfer system according to claim 1, wherein the creating the list registers the content associated with each display area into the list in accordance with an order defined by size of the display area.

4. The content transfer system according to claim 1, wherein the creating the list registers the content associated with each display area into the list in accordance with an order in which the display area was updated.

5. The content transfer system according to claim 1, wherein the creating the list registers the content associated with each display area into the list in accordance with an order in which the display area was activated.

6. The content transfer system according to claim 1, wherein the processor in the content transfer apparatus further configured to determine, in accordance with a prescribed rule, the content to be transferred to the terminal from among the content registered in the list.

7. The content transfer system according to claim 1, wherein the generating the connection signal containing connection information generates the connection signal by including therein not only the connection information but also a name identifying at least one piece of content selected from among the content registered in the list and a path indicating a storage area where the selected content is stored, the recovering the connection information recovers the name and path of the content from the connection signal, the transmitting the content transfer request signal transmits the content transfer request signal by including therein the name and path of the content, and the transferring the at least one piece of content transfers to the terminal the content identified by the name and path of the content included in the content transfer request signal from among the plurality of pieces of content.

8. The content transfer system according to claim 1, wherein the processor in the terminal further configured to:

in accordance with the connection information, transmit a list transfer request to the content transfer apparatus via the communication network; and select any of content from the list in response to an operation accepted via an operating device, and wherein:

the transmitting the content transfer request signal transmits the content transfer request signal by including therein a name identifying the selected content and a path indicating a storage area where the selected content is stored, and the transferring the at least one piece of content transfers to the terminal the content identified by the name and the path of the content included in the content transfer request signal from among the plurality of pieces of content.

9. The content transfer system according to claim 1, wherein the connection information output device is the display.

10. The content transfer system according to claim 9, wherein the connection signal is a QR code.

11. The content transfer system according to claim 9, wherein the connection signal is a digital watermark embedded in a display screen on the display.

12. The content transfer system according to claim 1, wherein the content includes access information to another communication apparatus, and when the content is received from the content transfer apparatus, the terminal accesses that other communication apparatus in accordance with the access information included in the content.

13. A content transfer apparatus comprising:
a storage device configured to store a plurality of pieces of content;
a display configured to display at least one display area, each of the at least one display area associated with one of the plurality of pieces of content; and
a processor configured to
generate a connection signal containing connection information for connecting to the content transfer apparatus via a communication network, and output the connection signal via a connection information output device;

create a list of content associated with the display area displayed on the display from among the plurality of pieces of content, and update the list at predetermined intervals of time or at any time when a change is made to any one of the display areas displayed on the display; and transfer, when a content transfer request signal is received from another apparatus, at least one piece of content selected from among content registered in the list among the plurality of pieces of content to the other apparatus, wherein the updating the list stores the list in the storage device along with a sequence number which changes each time the list is updated, the generating the connection signal containing connection information generates the connection signal by including therein the sequence number corresponding to the most recently updated list each time the list is updated, and the transferring the at least one piece of content identifies the content to be transferred to the other apparatus by referring to the list corresponding to the sequence number included in the content transfer request signal.

14. A terminal comprising:

a camera configured to acquire a connection signal containing connection information for connecting to a content transfer apparatus via a communication network; and a processor configured to recover the connection information from the connection signal;

transmit a list request signal requesting a list of content to the content transfer apparatus via the communication network in accordance with the connection information;

select any of content from the list in response to an operation accepted via an operating device; and transmit a content transfer request signal to the content transfer apparatus via the communication network by including therein a name identifying the selected content and a path indicating a storage area where the selected content is stored in accordance with the connection information, wherein the connection signal further contains a sequence number corresponding to the most recently updated list, and wherein the recovering the connection information recovers the sequence number along with the connection information from the connection signal, and the transmitting the content transfer request signal transmits the content transfer request signal by including therein the recovered sequence number.

15. A content transfer method in a content transfer system including a content transfer apparatus in which a plurality of pieces of content is stored and a terminal, for transferring at least one of the plurality of pieces of content from the content transfer apparatus to the terminal, the content transfer method comprising:

generating, by the content transfer apparatus, a connection signal containing connection information for connecting to the content transfer apparatus via a communication network and outputs the connection signal via a connection information output device, displaying, by the content transfer apparatus, on a display at least one display area, each of the at least one display area associated with one of the plurality of pieces of content, creating, by the content transfer apparatus, a list of content associated with the display area displayed on the display from among the plurality of pieces of content, and updating the list at predetermined intervals of time or at any time when a change is made to any one of the display areas displayed on the display, and when a content transfer request signal is received from the terminal, transferring, by the content transfer apparatus, at least one piece of content selected from among content registered in the list among the plurality of pieces of content to the terminal, and wherein acquiring, by the terminal, the connection signal, recovering, by the terminal, the connection information from the connection signal, and in accordance with the connection information, transmitting, by the terminal, the content transfer request signal to the content transfer apparatus via the communication network, wherein the updating the list stores the list in the content transfer apparatus along with a sequence number which changes each time the list is updated, the generating the connection signal containing connection information generates the connection signal by including therein the sequence number corresponding to the most recently updated list each time the list is updated, the recovering the connection information recovers the sequence number along with the connection information from the connection signal, the transmitting the content transfer request signal transmits the content transfer request signal by including therein the recovered sequence number, and the transferring the at least one piece of content identifies the content to be transferred to the terminal by referring to the list corresponding to the sequence number included in the content transfer request signal.

* * * * *